US008181005B2

(12) United States Patent
Zuraski, Jr. et al.

(10) Patent No.: US 8,181,005 B2
(45) Date of Patent: May 15, 2012

(54) HYBRID BRANCH PREDICTION DEVICE WITH SPARSE AND DENSE PREDICTION CACHES

(75) Inventors: Gerald D. Zuraski, Jr., Austin, TX (US); James D. Dundas, Austin, TX (US); Anthony X. Jarvis, Acton, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 721 days.

(21) Appl. No.: 12/205,429

(22) Filed: Sep. 5, 2008

(65) Prior Publication Data

US 2010/0064123 A1   Mar. 11, 2010

(51) Int. Cl.
*G06F 9/32* (2006.01)
*G06F 9/38* (2006.01)

(52) U.S. Cl. ........................................ 712/239; 712/240
(58) Field of Classification Search .................. 712/239, 712/240
See application file for complete search history.

(56) References Cited

U.S. PATENT DOCUMENTS

| 5,136,697 | A | * | 8/1992 | Johnson ........................ 712/239 |
| 5,574,871 | A | | 11/1996 | Hoyt et al. |
| 5,752,259 | A | * | 5/1998 | Tran ............................. 711/125 |
| 5,954,816 | A | | 9/1999 | Tran et al. |
| 6,067,616 | A | | 5/2000 | Stiles et al. |
| 6,108,774 | A | | 8/2000 | Muthusamy |
| 6,425,075 | B1 | | 7/2002 | Stiles et al. |
| 6,804,799 | B2 | | 10/2004 | Zuraski, Jr. |
| 6,854,050 | B1 | | 2/2005 | Zuraski, Jr. |
| 7,024,545 | B1 | * | 4/2006 | Zuraski et al. ................ 712/240 |
| 2004/0148497 | A1 | * | 7/2004 | Vahidsafa et al. ............ 712/239 |
| 2005/0228977 | A1 | * | 10/2005 | Cypher et al. ................ 712/240 |

FOREIGN PATENT DOCUMENTS

| EP | 0 798 632 | 10/1997 |
| WO | WO 99/23553 | 5/1999 |
| WO | WO 03/017091 | 2/2003 |

OTHER PUBLICATIONS

Daniel A. Jiménez, Heather L. Hanson, and Calvin Lin, "Boolean Formula-based Branch Prediction for Future Technologies", Proceedings of the International Conference on Parallel Architectures and Compilation Technologies (PACT), Barcelona, Spain 2001.
Daniel A. Jiménez, Calvin Lin, "Dynamic Branch Prediction with Perceptrons," hpca, pp. 197, Seventh International Symposium on High-Performance Computer Architecture (HPCA'01), 2001.
International Search Report Application No. PCT/US2009/056136 mailed Nov. 16, 2009.

* cited by examiner

*Primary Examiner* — Daniel Pan
(74) *Attorney, Agent, or Firm* — Rory D. Rankin; Meyertons, Hood, Kivlin, Kowert & Goetzel

(57) ABSTRACT

A system and method for branch prediction in a microprocessor. A hybrid device stores branch prediction information in a sparse cache for no more than a common smaller number of branches within each entry of the instruction cache. For the less common case wherein an i-cache line comprises additional branches, the device stores the corresponding branch prediction information in a dense cache. Each entry of the sparse cache stores a bit vector indicating whether or not a corresponding instruction cache line includes additional branch instructions. This indication may also be used to select an entry in the dense cache for storage. A second sparse cache stores entire evicted entries from the first sparse cache.

17 Claims, 8 Drawing Sheets

HYBRID BRANCH PREDICTION DEVICE WITH SPARSE AND DENSE PREDICTION CACHES

BACKGROUND OF THE INVENTION

1. Field of the Invention

This invention relates to microprocessors, and more particularly, to branch prediction mechanisms.

2. Description of the Relevant Art

Modern microprocessors may include one or more processor cores, or processors, wherein each processor is capable of executing instructions of a software application. These processors are typically pipelined, wherein the processors include one or more data processing stages connected in series with storage elements (e.g. registers and arrays) placed between the stages. The output of one stage is made the input of the next stage during a transition of a clock signal that defines a clock cycle or a phase, which may be a fraction of a clock cycle. Although the pipeline may be divided into any number of stages at which portions of instruction processing are performed, instruction processing generally comprises fetching the instruction, decoding the instruction, executing the instruction, and storing the execution results in the destination identified by the instruction.

Ideally, every clock cycle produces useful execution of an instruction for each stage of a pipeline. However, a stall in a pipeline may cause no useful work to be performed during that particular pipeline stage. Some stalls may last several clock cycles and significantly decrease processor performance. Some examples of a stall include a data-cache or instruction-cache miss, data dependency between instructions, and control flow misprediction, such as a mispredicted branch instruction.

The negative effect of stalls on processor performance may be reduced by overlapping pipeline stages. A further technique is to allow out-of-order execution of instructions, which helps reduce data dependent stalls. In addition, a core with a superscalar architecture issues a varying number of instructions per clock cycle based on dynamic scheduling. However, a stall of several clock cycles still reduces the performance of the processor due to in-order retirement that may prevent hiding of all the stall cycles. Therefore, another method to reduce performance loss is to reduce the occurrence of multi-cycle stalls. One such multi-cycle stall is a misprediction of a control flow instruction, such as a branch instruction.

Branch instructions comprise many types such as conditional or unconditional and direct or indirect. A conditional branch instruction performs a determination of which path to take in an instruction stream. If the branch instruction determines a specified condition, which may be encoded within the instruction, is not satisfied, then the branch instruction is considered to be not-taken and the next sequential instruction in a program order is executed. However, if the branch instruction determines a specified condition is satisfied, then the branch instruction is considered to be taken. Accordingly, a subsequent instruction which is not the next sequential instruction in program order, but rather is an instruction located at a branch target address, is executed. An unconditional branch instruction is considered an always-taken conditional branch instruction. There is no specified condition within the instruction to test, and execution of subsequent instructions always occurs in a different sequence than sequential order.

In addition, a branch target address may be specified by an offset, which may be stored in the branch instruction itself, relative to the linear address value stored in the program counter (PC) register. This type of branch target address is referred to as direct. A branch target address may also be specified by a value in a register or memory, wherein the register or memory location may be stored in the branch instruction. This type of branch target address is referred to as indirect. Further, in an indirect branch instruction, the register specifying the branch target address may be loaded with different values.

Examples of unconditional indirect branch instructions include procedure calls and returns that may be used for implementing subroutines in program code, and that may use a Return Address Stack (RAS) to supply the branch target address. Another example is an indirect jump instruction that may be used to implement a switch-case statement, which is popular in object-oriented programs such as C++ and Java.

An example of a conditional branch instruction is a branch instruction that may be used to implement loops in program code (e.g. "for" and "while" loop constructs). Conditional branch instructions must satisfy a specified condition to be considered taken. An example of a satisfied condition may be a specified register now holds a stored value of zero. The specified register is encoded in the conditional branch instruction. This specified register may have its stored value decrementing in a loop due to instructions within software application code. The output of the specified register may be input to dedicated zero detect combinatorial logic.

In addition, conditional branch instructions may have some dependency on one another. For example, a program may have a simple case such as:

if (value==0) value==1;

if (value==1)

The conditional branch instructions that will be used to implement the above case will have global history that may be used to improve the accuracy of predicting the conditions. In one embodiment, the prediction may be implemented by 2-bit counters. Branch prediction is described in more detail next.

Modern microprocessors may need multiple clock cycles to both determine the outcome of the condition of a branch instruction and to determine the branch target address. For a particular thread being executed in a particular pipeline, no useful work may be performed by the branch instruction or subsequent instructions until the branch instruction is decoded and later both the condition outcome is known and the branch target address is known. These stall cycles decrease the processor's performance.

Rather than stall, predictions may be made of the conditional branch condition and the branch target address shortly after the instruction is fetched. The exact stage as to when the prediction is ready is dependent on the pipeline implementation. In order to predict a branch condition, the PC used to fetch the instruction from memory, such as from an instruction cache (i-cache), may be used to index branch prediction logic. One example of an early combined prediction scheme that uses the PC is the gselect branch prediction method described in Scott McFarling's 1993 paper, "Combining Branch Predictors", Digital Western Research Laboratory Technical Note TN-36, incorporated herein by reference in its entirety. The linear address stored in the PC may be combined with values stored in a global history register in a hashing function. The output of the hashing function and the PC may be used to index prediction tables such as a pattern history table (PHT), a branch target buffer (BTB), or otherwise. The update of the global history register with branch target address information of a current branch instruction, rather than a taken or not-taken prediction, may increase the prediction accuracy of both conditional branch direction predictions (i.e. taken and not-taken outcome predictions) and indirect branch target address predictions, such as a BTB prediction or an indirect target array prediction. Many different schemes may be included in various embodiments of branch prediction mechanisms.

High branch prediction accuracy contributes to more power-efficient and higher performance microprocessors. Instructions from the predicted instruction stream may be speculatively executed prior to execution of the branch instruction, and in any case are placed into a processor's pipeline prior to execution of the branch instruction. If the predicted instruction stream is correct, then the number of instructions executed per clock cycle is advantageously increased. However, if the predicted instruction stream is incorrect (i.e. one or more branch instructions are predicted incorrectly), then the instructions from the incorrectly predicted instruction stream are discarded from the pipeline and the number of instructions executed per clock cycle is decreased.

Frequently, branch prediction mechanism comprises a history of prior executions of a branch instruction in order to form a more accurate behavior for the particular branch instruction. Such a branch prediction history typically requires maintaining data corresponding to the branch instruction in a storage. Also, a branch target buffer (BTB) may be used to store whole or partial branch target addresses used in target address predictions. In the event the branch prediction data comprising history and address information are evicted from the storage, or otherwise lost, it may be necessary to recreate the data for the branch instruction at a later time.

One solution to the above problem may be to increase the size of the branch prediction storage. However, increasing the size of branch prediction storage may require a significant increase in gate area and the size of the branch prediction mechanism. Consequently, by reducing the size of the branch prediction storage in order to reduce gate area and power consumption, valuable data regarding the behavior of a branch may be evicted and must be recreated.

In view of the above, efficient methods and mechanisms for improving branch prediction capability that does not require a significant increase in the gate count or size of the branch prediction mechanism are desired.

SUMMARY OF THE INVENTION

Systems and methods for branch prediction in a microprocessor are contemplated.

In one embodiment, a hybrid branch prediction device within a microprocessor is provided. Rather than allocate storage for branch prediction information for a predetermined number of branches within each entry of an instruction cache (i-cache), the hybrid device stores branch prediction information in a first storage for no more than a common smaller number of branches within each entry of the instruction cache. For the less common case wherein an i-cache line comprises additional branches, the device stores the corresponding branch prediction information in a secondary storage.

Also contemplated is a hybrid branch prediction device which comprises a sparse cache and a dense cache. Each entry of the sparse cache corresponds to an entry, or cache line, of an instruction cache. These corresponding entries may be selected by the same address sent from the processor during an instruction fetch request. Each of the entries of the sparse cache stores branch prediction information for no more than a predetermined number of branch instructions within an instruction cache line. Also, each entry stores an indication, such as a bit vector, of whether or not this instruction cache line may include additional branch instructions. This indication may also be used to select an entry in the dense cache for storing branch prediction information for an additional branch. The hybrid branch prediction device also comprises a second sparse cache for storing evicted entries from the first sparse cache. The entire entry is stored so no branch prediction information is lost or needs to be rebuilt later.

Figure 1:
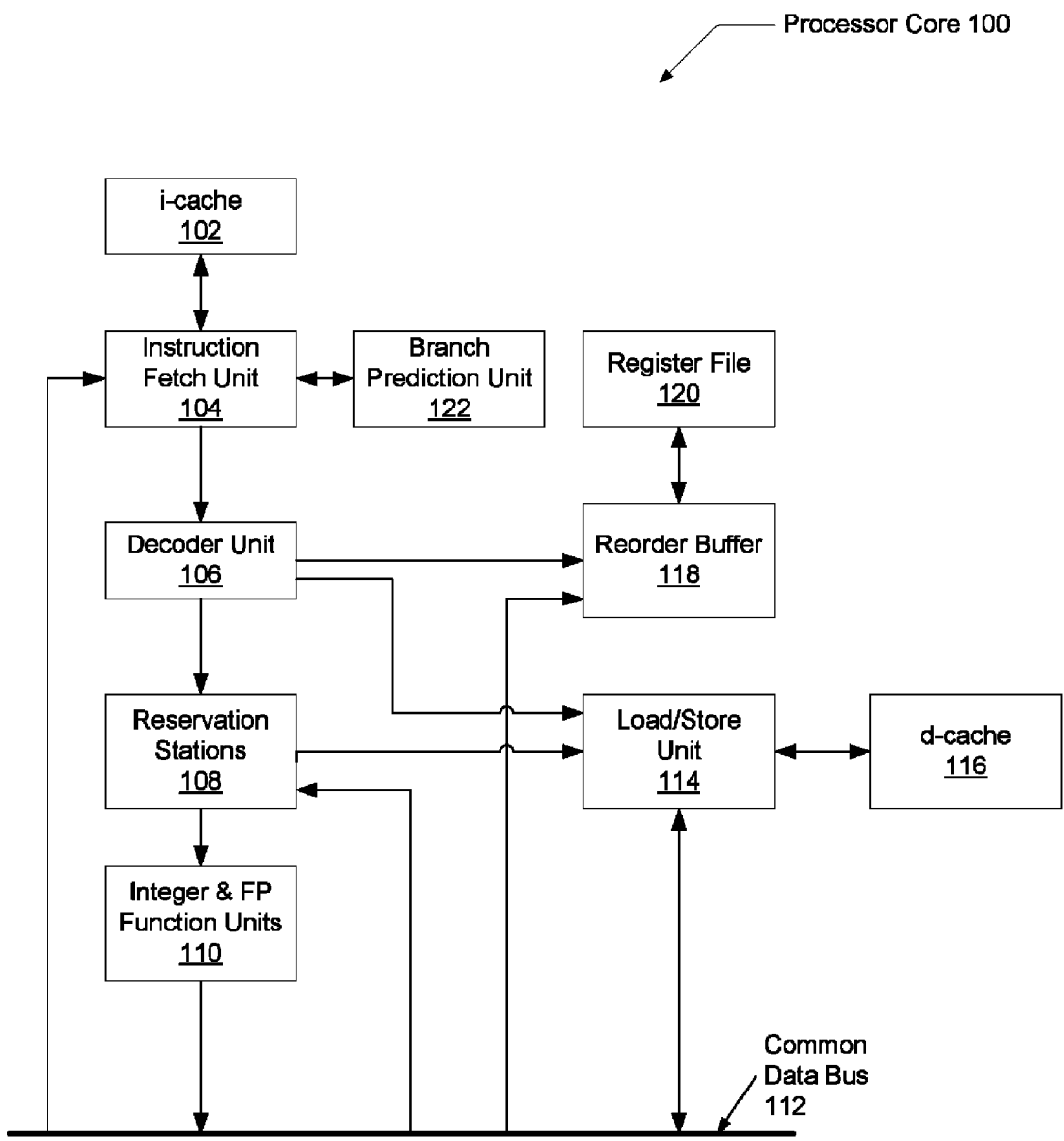
FIG. 1 is a generalized block diagram of one embodiment of a processor core.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Referring to FIG. 1, one embodiment of a generalized block diagram of a processor core 100 that performs out-of-order execution is shown. Core 100 includes circuitry for executing instructions according to a predefined instruction set architecture (ISA). For example, the x86 instruction set architecture may be selected. Alternatively, any other instruction set architecture may be selected. In one embodiment, core 100 may be included in a single-processor configuration. In another embodiment, core 100 may be included in a multi-processor configuration. In other embodiments, core 100 may be included in a multi-core configuration within a processing node of a multi-node system.

An instruction-cache (i-cache) 102 may store instructions for a software application and a data-cache (d-cache) 116 may store data used in computations performed by the instructions. Generally speaking, a cache may store one or more blocks, each of which is a copy of data stored at a corresponding address in the system memory, which is not shown. As used herein, a "block" is a set of bytes stored in contiguous memory locations, which are treated as a unit for coherency purposes. In some embodiments, a block may also be the unit of allocation and deallocation in a cache. The number of bytes in a block may be varied according to design choice, and may be of any size. As an example, 32 byte and 64 byte blocks are often used.

Caches 102 and 116, as shown, may be integrated within processor core 100. Alternatively, caches 102 and 116 may be coupled to core 100 in a backside cache configuration or an inline configuration, as desired. Still further, caches 102 and 116 may be implemented as a hierarchy of caches. In one embodiment, caches 102 and 116 each represent L1 and L2 cache structures. In another embodiment, caches 102 and 116 may share another cache (not shown) implemented as an L3 cache structure. Alternatively, each of caches 102 and 116 each represent an L1 cache structure and a shared cache structure may be an L2 cache structure. Other combinations are possible and my be chosen, if desired.

Caches 102 and 116 and any shared caches may each include a cache memory coupled to a corresponding cache controller. If core 100 is included in a multi-core system, a memory controller (not shown) may be used for routing packets, receiving packets for data processing, and synchronize the packets to an internal clock used by logic within core 100. Also, in a multi-core system, multiple copies of a memory block may exist in multiple caches of multiple processors. Accordingly, a cache coherency circuit may be included in the memory controller. Since a given block may be stored in one or more caches, and further since one of the cached copies may be modified with respect to the copy in the memory system, computing systems often maintain coherency between the caches and the memory system. Coherency is maintained if an update to a block is reflected by other cache copies of the block according to a predefined coherency protocol. Various specific coherency protocols are well known.

The instruction fetch unit (IFU) 104 may fetch multiple instructions from the i-cache 102 per clock cycle if there are no i-cache misses. The IFU 104 may include a program counter (PC) register that holds a pointer to an address of the next instructions to fetch from the i-cache 102. A branch prediction unit 122 may be coupled to the IFU 104. Unit 122 may be configured to predict information of instructions that change the flow of an instruction stream from executing a next sequential instruction. An example of prediction information may include a 1-bit value comprising a prediction of whether or not a condition is satisfied that determines if a next sequential instruction should be executed or an instruction in another location in the instruction stream should be executed next. Another example of prediction information may be an address of a next instruction to execute that differs from the next sequential instruction. The determination of the actual outcome and whether or not the prediction was correct may occur in a later pipeline stage. Also, in an alternative embodiment, IFU 104 may comprise unit 122, rather than have the two be implemented as two separate units.

The decoder unit 106 decodes the opcodes of the multiple fetched instructions. Decoder unit 106 may allocate entries in an in-order retirement queue, such as reorder buffer 118, in reservation stations 108, and in a load/store unit 114. The allocation of entries in the reservation stations 108 is considered dispatch. The reservation stations 108 may act as an instruction queue where instructions wait until their operands become available. When operands are available and hardware resources are also available, an instruction may be issued out-of-order from the reservation stations 108 to the integer and floating point functional units 110 or the load/store unit 114. The functional units 110 may include arithmetic logic units (ALU's) for computational calculations such as addition, subtraction, multiplication, division, and square root. Logic may be included to determine an outcome of a branch instruction and to compare the calculated outcome with the predicted value. If there is not a match, a misprediction occurred, and the subsequent instructions after the branch instruction need to be removed and a new fetch with the correct PC value needs to be performed.

The load/store unit 114 may include queues and logic to execute a memory access instruction. Also, verification logic may reside in the load/store unit 114 to ensure a load instruction received forwarded data, or bypass data, from the correct youngest store instruction.

Results from the functional units 110 and the load/store unit 114 may be presented on a common data bus 112. The results may be sent to the reorder buffer 118. Here, an instruction that receives its results, is marked for retirement, and is head-of-the-queue may have its results sent to the register file 120. The register file 120 may hold the architectural state of the general-purpose registers of processor core 100. In one embodiment, register file 120 may contain 32 32-bit registers. Then the instruction in the reorder buffer may be retired in-order and its head-of-queue pointer may be adjusted to the subsequent instruction in program order.

The results on the common data bus 112 may be sent to the reservation stations in order to forward values to operands of instructions waiting for the results. When these waiting instructions have values for their operands and hardware resources are available to execute the instructions, they may be issued out-of-order from the reservation stations 108 to the appropriate resources in the functional units 110 or the load/store unit 114. Results on the common data bus 112 may be routed to the IFU 104 and unit 122 in order to update control flow prediction information and/or the PC value.

Figure 2:
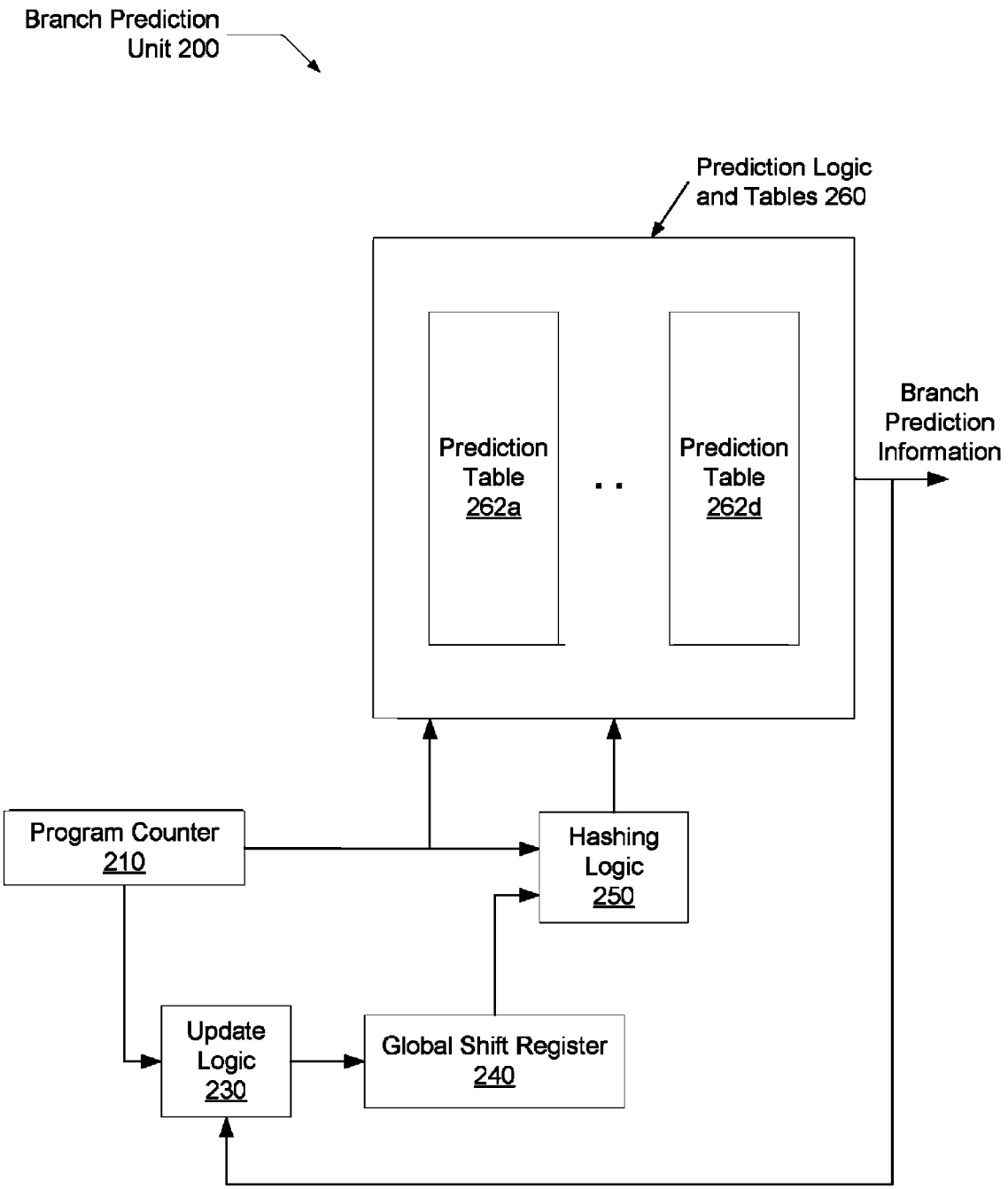
FIG. 2 is a generalized block diagram illustrating one embodiment of a branch prediction unit.

FIG. 2 illustrates one embodiment of a branch prediction unit 200. The address of an instruction is stored in the register program counter 210 (PC 210). In one embodiment, the address may be a 32-bit or a 64-bit value. A global history shift register 240 (GSR 240) may contain a recent history of the prediction results of a last number of conditional branch instructions. In one embodiment, GSR 240 may be a one-entry 10-bit shift register. In other embodiments, the shift register GSR 240 may include a different number of bits. The information stored in GSR 240 may be used to predict whether or not a condition is satisfied of a current conditional branch instruction by using global history. For example, in one embodiment, GSR 240 may be a 10-bit shift register that holds the 1-bit taken/not-taken results of the last 10 conditional branch instructions in program execution. In one embodiment, a logic "1" may indicate a taken outcome and a logic "0" may indicate a not-taken outcome, or vice-versa. Additionally, in alternative embodiments, GSR 240 may use information corresponding to a per-branch basis or to a combined-branch history within a table of branch histories. One or more branch history tables (BHTs) may be used in these embodiments to provide global history information to be used to make branch predictions.

If enough address bits (i.e. the PC of the current branch instruction stored in PC 210) are used to identify the current branch instruction, a hashing of these bits with the global history stored in GSR 240 may have more useful prediction information than either component alone. In one embodiment, the low-order 10 bits of the PC may be hashed with the 10 bits of the GSR. In alternate embodiments, bits other than the low-order 10 bits of the PC, and possibly non-consecutive bits, may be hashed with the bits of the GSR. Also, multiple portions of the GSR 240 may be separately hashed with PC 210. For example, a 26-bit GSR 240 may have its lower 13 bits combined with PC 210 in a first hashing function and the upper 13 bits combined with PC 210 in a second hashing function. The two separate outputs may then be conveyed to Prediction Logic and Tables 260. Numerous such alternatives are possible and are contemplated.

In one embodiment, the hashing of the PC bits and the GSR bits may comprise concatenation of the bits. In an alternative embodiment, the result of a hashing function may include an exclusive OR of the PC bits with the GSR bits. Other hashing functions performed in hashing logic 250 may be used to determine an index to one or more pattern history tables (PHTs) and/or other tables included in prediction logic 260. In one embodiment, the PC alone may be used to index BTBs in prediction logic 260. As used herein, elements referred to by a reference numeral followed by a letter may be collectively referred to by the numeral alone. For example, prediction tables 262a-262d may be collectively referred to as prediction tables 262.

In one embodiment, one prediction table 262 may be a PHT for conditional branches, wherein each entry of the PHT may hold a 2-bit counter. A particular 2-bit counter may be incremented and decremented based on past behavior of the conditional branch instruction result (i.e. taken or not-taken). Once a predetermined threshold value is reached, the stored prediction may flip between a 1-bit prediction value of taken and not-taken. In a 2-bit counter scenario, each entry of the PHT may hold one of the following four states in which each state corresponds to 1-bit taken/not-taken prediction value: predict strongly not-taken, predict not-taken, predict strongly taken, and predict taken.

Alternatively, one or more prediction tables 262 may be indexed by an output of hashing logic 250 as discussed above and these tables 262 may store, in one embodiment, four-bit weights that are trained. In one embodiment, two tables 262 may be indexed in the same clock cycle. In one embodiment, these two tables 262 are indexed by the same output from hashing logic 250. In an alternate embodiment, these two tables 262 are indexed by separate outputs of separate hashing functions within the logic of hashing logic 250. The corresponding two weights that are read out are sign-extended by two bits and may be added to one another by logic within prediction logic 260. Alternately, these two sign-extended values may also be added together and added to a bias weight. This bias weight, which is also sign extended by two bits, may be read out of a branch prediction storage, which will be described in more detail later. The most-significant-byte (MSB) of the 6-bit sum may be used to indicate the predicted direction of conditional branch instructions.

In one embodiment, these tables 262 may be accessed by an output from hashing logic 250 that includes a branch number (e.g. 1, 2, etc.) from branch prediction storage as an input to logic 250. These branch numbers may be used to distinguish separate branch instructions being predicted in the same clock cycle. For example, the row access of the tables 262 may use a portion of GSR 240 without being hashed, such as the lower 7 bits of GSR 240, in one embodiment. The output of these tables 262 may be reduced by multiplexers using a hash output for its select line(s). The input to this hashing function within logic 250 may include PC 210, a separate portion of GSR 240, such as the bit range 23 to 7, in one embodiment, and a corresponding branch number.

Once a prediction (e.g. taken/not-taken or branch target address or both) is determined, its value may be shifted into the GSR 240 speculatively. In one embodiment, only a taken/not-taken value is shifted into GSR 240. In other embodiments, a portion of the branch target address is shifted into GSR 240. A determination of how to update GSR 240 is performed in update logic 230. In the event of a misprediction determined in a later pipeline stage, this value(s) may be repaired with the correct outcome. However, this process also incorporates terminating the instructions fetched due to the branch misprediction that are currently in flight in the pipeline and re-fetching instructions from the correct PC. These steps include pipeline stalls that hinder processor performance.

In one embodiment, the 1-bit taken/not-taken prediction from a PHT or other logic in prediction logic and tables 260 may be used to determine the next PC to use to index an i-cache, and simultaneously to update the GSR 240. For example, in one embodiment, if the prediction is taken, the branch target address may be used to determine the next PC. If the prediction is not-taken, the next sequential PC may be used to determine the next PC.

In one embodiment, update logic 230 may determine the manner in which GSR 240 is updated. For example, in the case of conditional branches requiring a global history update, update logic 230 may determine to shift the 1-bit taken/not-taken prediction bit into the most-recent position of GSR 240. In an alternate embodiment, a branch may not provide a value for the GSR. In other embodiments, a portion of the branch target address may be input to the GSR 240, such as for indirect branches, since a hash of GSR 240 and PC 210 may be used to index an indirect prediction array within prediction logic 260. This portion, for example, 4 bits in one embodiment, of the branch target address may be chosen from a mid-section of the branch target address. The high-order bits of the branch target address will not change often among instructions placed in a similar location in memory, and the low-order bits change frequently due to accesses to different lines, words, and bytes within memory. For example, in one embodiment, bits 7 to 4 of the branch target address may be used.

In an alternative embodiment, update logic 230 may not perform a shift operation into GSR 240, but rather perform an exclusive OR of one or more bits of the branch target address and one or more selected bits of GSR 240. Then the selected bits of GSR 240 are replaced with the outcome of the exclusive OR. For example, the outcome of an exclusive OR of 3 bits of the branch target address, such as bits 7 to 5 of the branch target address, and the most-recent 3 bits of GSR 240, may replace the most-recent 3 bits of GSR 240. Other embodiments of update logic 230 may be implemented. In each case, a portion of the branch target address of an indirect branch instruction may be used to update the global history in an effort to correlate the occurrence of these instructions with current branch prediction mechanisms. Whether or not a given branch, or type of branch, provides a value for the GSR is a design choice.

In each implementation of update logic 230, the new global history stored in GSR 240 may increase the accuracy of both conditional branch direction predictions (i.e. taken/not-taken outcome predictions) and indirect branch target address predictions, such as a BTB prediction or an indirect target array prediction. The accuracy improvements may be reached with negligible impact on die-area, power consumption, and clock cycle increase.

Figure 3:
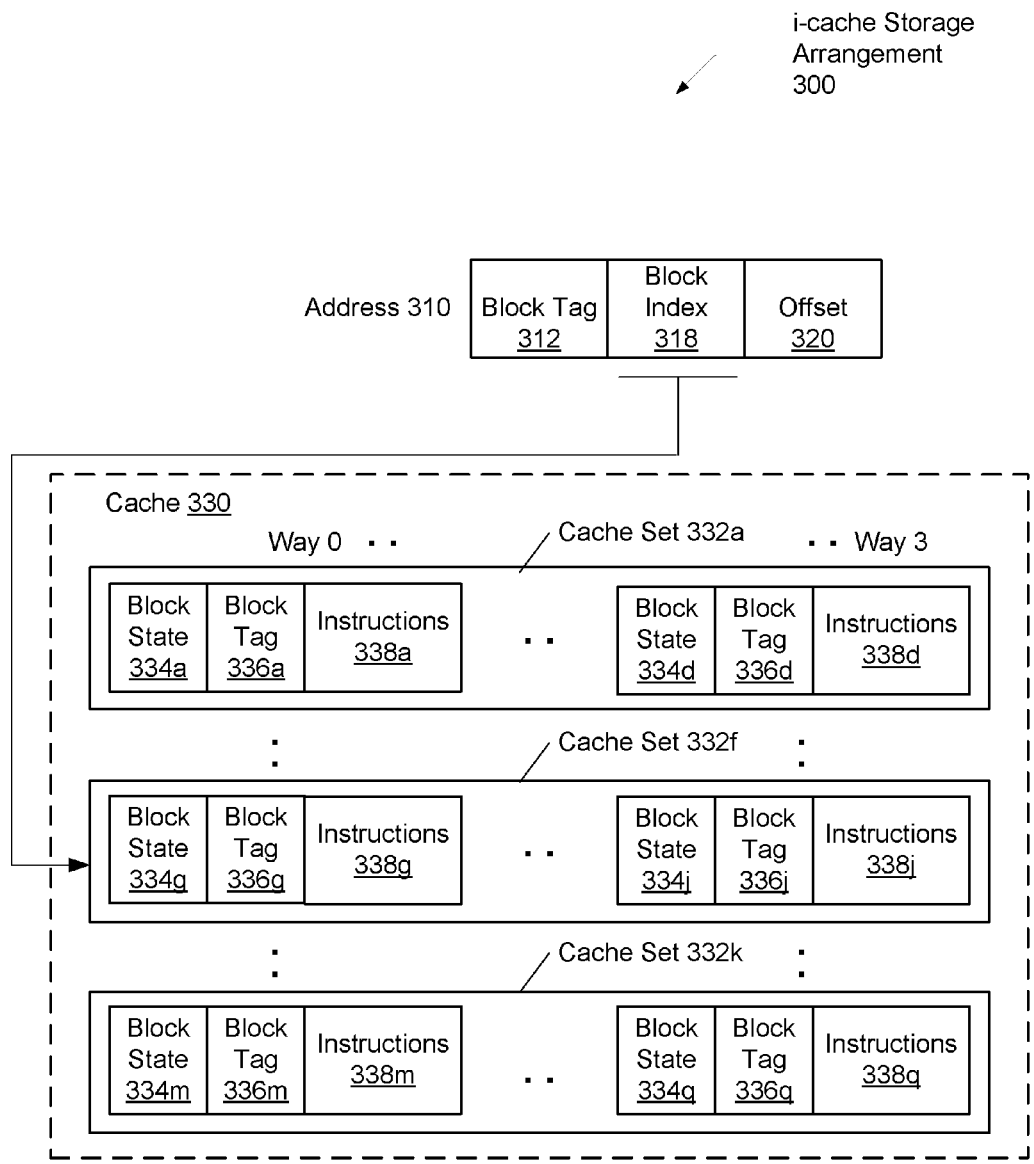
FIG. 3 is a generalized block diagram illustrating one embodiment of an i-cache storage arrangement.

Software application instructions may be stored within an instruction cache, such as i-cache 102 of FIG. 1 in various manners. For example, FIG. 3 illustrates one embodiment of an i-cache storage arrangement 300 in which instructions are stored using a 4-way set-associative cache organization.

Instructions 338, which may be variable-length instructions depending on the ISA, may be the data portion or block data of a cache line within 4-way set associative cache 330. In one embodiment, instructions 338 of a cache line may comprise 64 bytes. In an alternate embodiment, a different size may be chosen.

The instructions that may be stored in the contiguous bytes of instructions 338 may include one or more branch instructions. Some cache lines may have only a few branch instructions and other cache lines may have several branch instructions. The number of branch instructions per cache line is not consistent. Therefore, a storage of branch prediction information for a corresponding cache line may need to assume a high number of branch instructions are stored within the cache line in order to provide information for all branches. However, such a storage would need to require a lot of die area and it would increase power consumption. A hybrid storage that has a primary storage for information of a common-case number of branch instructions per cache line, which may be a low number, and an indication of additional branches within the cache line for non-common cases may be more efficient. Within the hybrid storage scheme may be a secondary storage for the additional branches indicated by the primary storage. More details of such a hybrid storage scheme are provided later.

Each of the 4 ways of cache 330 also has state information 334, which may comprise a valid bit and other state information of the cache line. For example, a state field may include encoded bits used to identify the state of a corresponding cache block, such as states within a MOESI scheme. Additionally, a field within block state 334 may include bits used to indicate Least Recently Used (LRU) information for an eviction. LRU information may be used to indicate which entry in the cache set 332 has been least recently referenced, and may be used in association with a cache replacement algorithm employed by a cache controller.

An address 310 presented to the cache 330 from a processor core may include a block index 318 in order to select a corresponding cache set 332. In one embodiment, block state 334 and block tag 336 may be stored in a separate array, rather than in contiguous bits within a same array. Block tag 336 may be used to determine which of the 4 cache lines are being accessed within a chosen cache set 332. In addition, offset 320 of address 310 may be used to indicate a specific byte or word within a cache line.

Figure 4:
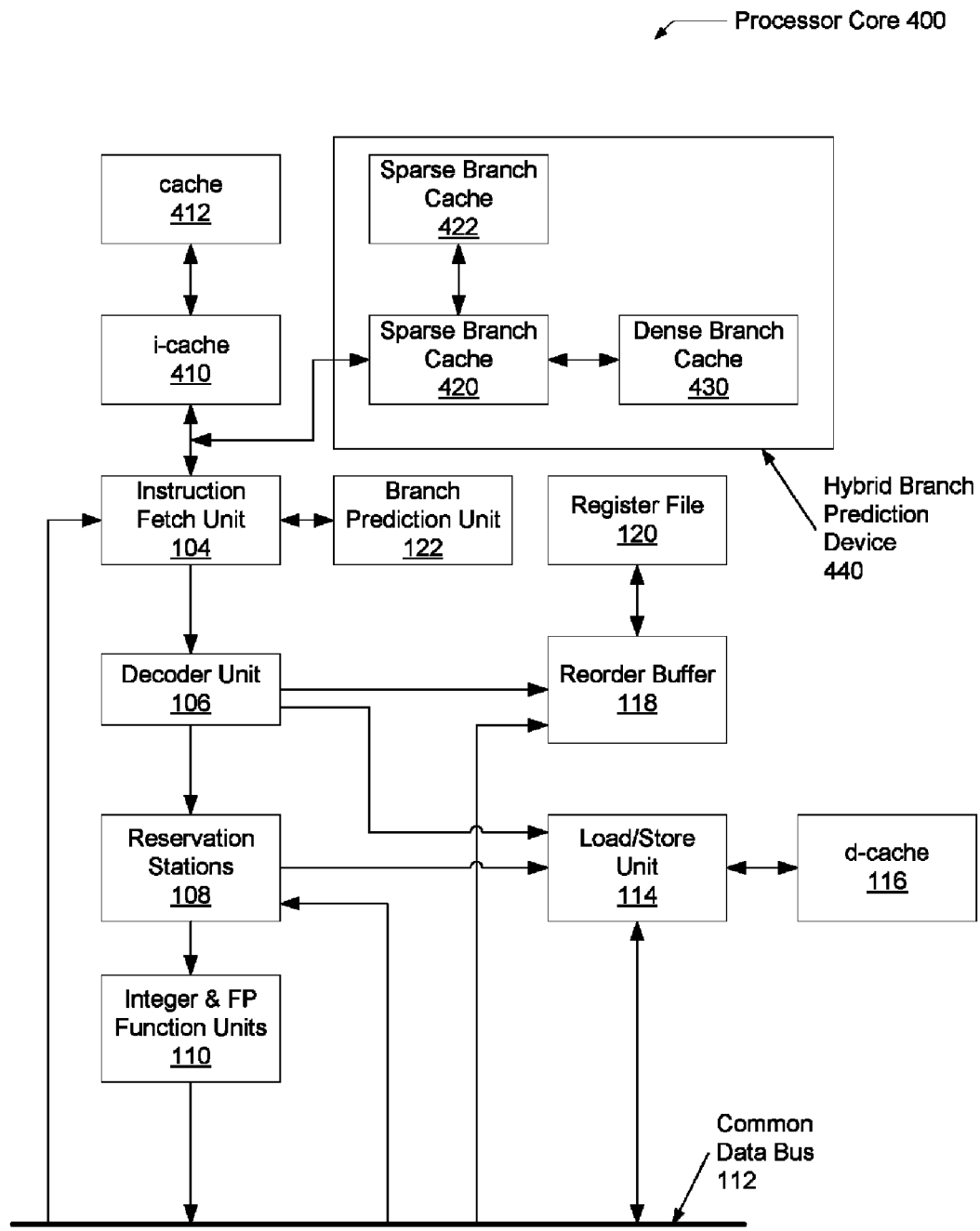
FIG. 4 is a generalized block diagram illustrating one embodiment of a processor core with hybrid branch prediction.

Turning next to FIG. 4, a generalized block diagram of one embodiment of a processor core 400 with hybrid branch prediction is shown. Circuit portions that correspond to those of FIG. 1 are numbered identically. The first two levels of a cache hierarchy for the i-cache subsystem are explicitly shown as i-cache 410 and cache 412. The caches 410 and 412 may be implemented, in one embodiment, as an L1 cache structure and an L2 cache structure, respectively. In one embodiment, cache 412 may be a split second-level cache that stores both instructions and data. In an alternate embodiment, cache 412 may be a shared cache amongst two or more cores and requires a cache coherency control circuit in a memory controller. In other embodiments, an L3 cache structure may be present on-chip or off-chip, and the L3 cache may be shared amongst multiple cores, rather than cache 412.

As stated earlier, for a useful proportion of addresses being fetched from i-cache 410, only a few branch instructions may be included in a corresponding i-cache line. Generally speaking, for a large proportion of most application code, branches are found only sparsely within an i-cache line. Therefore, storage of branch prediction information corresponding to a particular i-cache line may not need to allocate circuitry for storing information for a large number of branches. For example, hybrid branch prediction device 440 may more efficiently allocate die area and circuitry for storing branch prediction information to be used by branch prediction unit 122. Sparse branch cache 420 may store branch prediction information for a predetermined common sparse number of branch instructions per i-cache line. Each cache line within i-cache 410 may have a corresponding entry in sparse branch cache 420. In one embodiment, a common sparse number of branches may be 2 branches for each 64-byte cache line within i-cache 410. By storing prediction information for only a sparse number of branches for each line within i-cache 410, cache 420 may be greatly reduced in size from a storage that contains information for a predetermined maximum number of branches for each line within i-cache 410. Die area requirements, capacitive loading, and power consumption may each be reduced.

In one embodiment, the i-cache 410 may be organized as a 4-way set-associative cache. Sparse branch cache 420 may be organized as a direct-mapped cache. Each entry of sparse branch cache 420 may correspond to a cache line within i-cache 410. Each entry of sparse branch cache 420 may comprise branch prediction information corresponding to a predetermined sparse number of branch instructions, such as 2 branches, in one embodiment, within a corresponding line of i-cache 410. The branch prediction information is described in more detail later. In alternate embodiments, a different number of branch instructions may be determined to be sparse and the size of a line within i-cache 410 may be of a different size. Cache 420 may be indexed by the same linear address that is sent from IFU 104 to i-cache 410. Both i-cache 410 and cache 420 may be indexed by a subset of bits within the linear address that corresponds to a cache line boundary. For example, in one embodiment, a linear address may comprise 32 bits with a little-endian byte order and a line within i-cache 410 may comprise 64 bytes. Therefore, caches 410 and 420 may each be indexed by a same portion of the linear address that ends with bit 6.

Sparse branch cache 422 may be utilized in core 400 to store evicted lines from cache 420. Cache 422 may have the same cache organization as cache 420. When a line is evicted from i-cache 410 and placed in Cache 412, its corresponding entry in cache 420 may be evicted from cache 420 and stored in cache 422. In this manner, when a previously evicted cache line is replaced from Cache 412 to i-cache 410, the corresponding branch prediction information for branches within this cache line is also replaced from cache 422 to cache 420. Therefore, the corresponding branch prediction information does not need to be rebuilt. Processor performance may improve due to the absence of a process for rebuilding branch prediction information.

For regions within application codes that contain more densely packed branch instructions, a cache line within i-cache 410 may contain more than a sparse number of branches. Each entry of sparse branch cache 420 may store an indication of additional branches beyond the sparse number of branches within a line of i-cache 410. If additional branches exist, the corresponding branch prediction information may be stored in dense branch cache 430.

Each entry of dense branch cache 430 may correspond to a portion of a line within i-cache 410. For example, i-cache 410 may have 64-byte lines and each entry of dense branch cache 430 may correspond to an 8-byte portion of a 64-byte line. Each entry of sparse branch cache 420 may have a vector of bits to designate which 8-byte portion of a corresponding 64-byte line may have additional branches, wherein the 64-byte line has more than the common sparse number of branches. The number of vector bits and the corresponding size of the represented portion of the i-cache line may be chosen to efficiently capture the behavior of regions of densely packed branches in application codes.

In one embodiment, dense branch cache 430 may be organized as a 4-way set-associative cache. Therefore, dense branch cache 430 may store branch prediction information for 4 branch instructions per 8-byte portion of a 64-byte line. With 8 8-byte portions within a 64-byte line, dense branch cache 430 may store branch prediction information for 32 branch instructions within a single 64-byte line. In this embodiment, the hybrid combination of the sparse branch cache 420 and the dense branch cache 430, may store branch prediction information of 34 branch instructions for a 64-byte line within i-cache 410 (2 sparse branches and 32 dense branches). The size, associativity, and density of the caches 410, 412, 420, 422, and 430 may be chosen to provide the best tradeoff between performance and power consumption for applications that will run on the target architecture.

Figure 5:
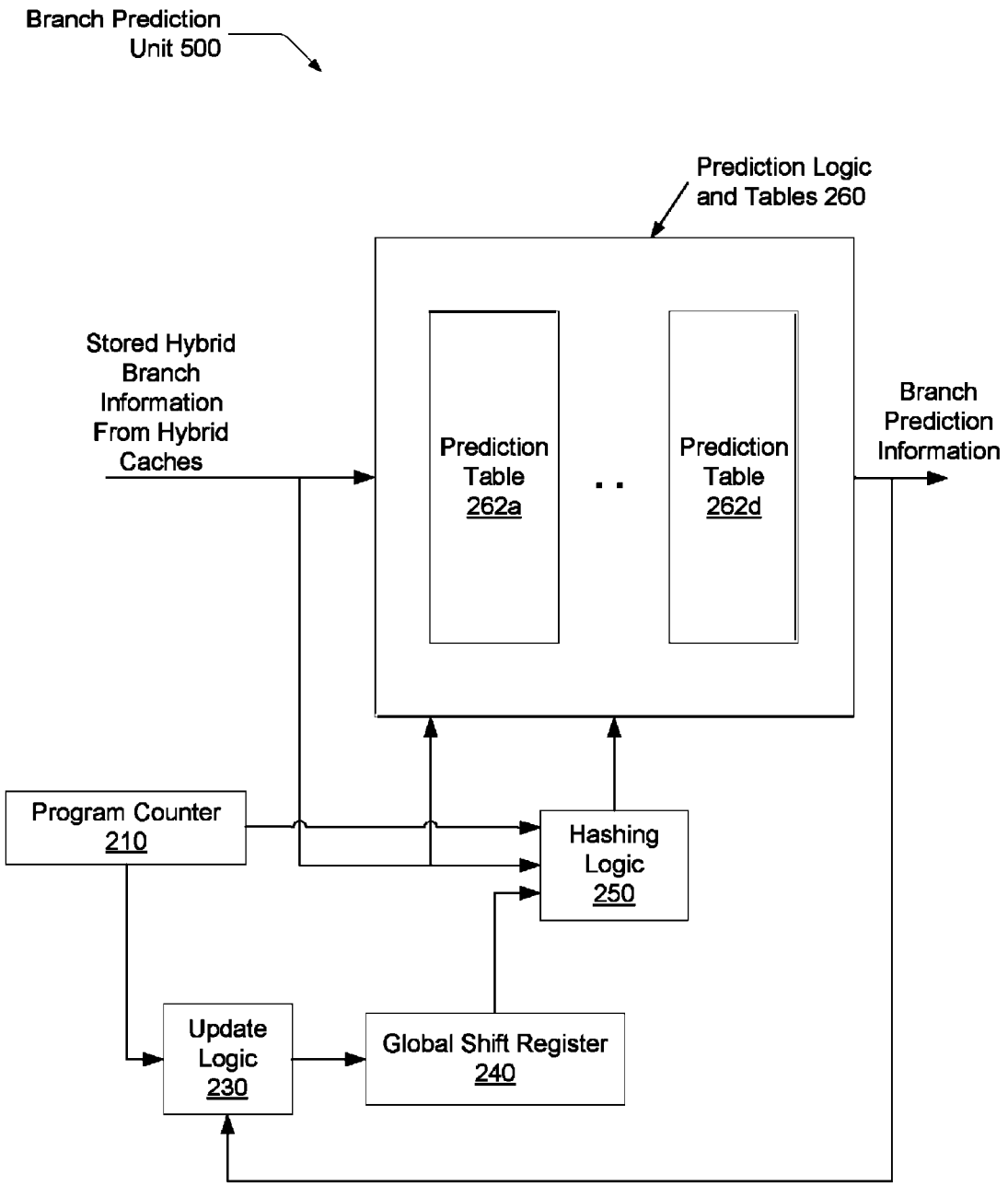
FIG. 5 is a generalized block diagram illustrating one embodiment of a branch prediction unit.

Referring to FIG. 5, one embodiment of a generalized block diagram of a branch prediction unit 500 is shown. Circuit portions that correspond to those of FIG. 2 are numbered identically. Here, stored hybrid branch prediction information may be conveyed to the prediction logic and tables 260 and to hashing logic 250. In one embodiment, the hybrid branch prediction information may be stored in separate caches from the i-caches, such as sparse branch caches 420 and 422 and dense branch cache 430. In one embodiment, this information may include a branch number to distinguish branch instructions being predicted within a same clock cycle, branch type information indicating a certain conditional branch instruction type or other, weight information to be summed with table entries within tables 260, additional address information, such as a pointer to an end byte of the branch instruction within a corresponding cache line, and corresponding branch target address information.

As discussed earlier, bias weight information from the stored hybrid branch information may be summed with two corresponding sign-extended weight values from tables within logic and tables 260. This bias weight may be sign-extended also prior to the summation and the most-significant-byte (MSB) of the 6-bit sum may be used to indicate the predicted direction of conditional branch instructions.

Figure 6:
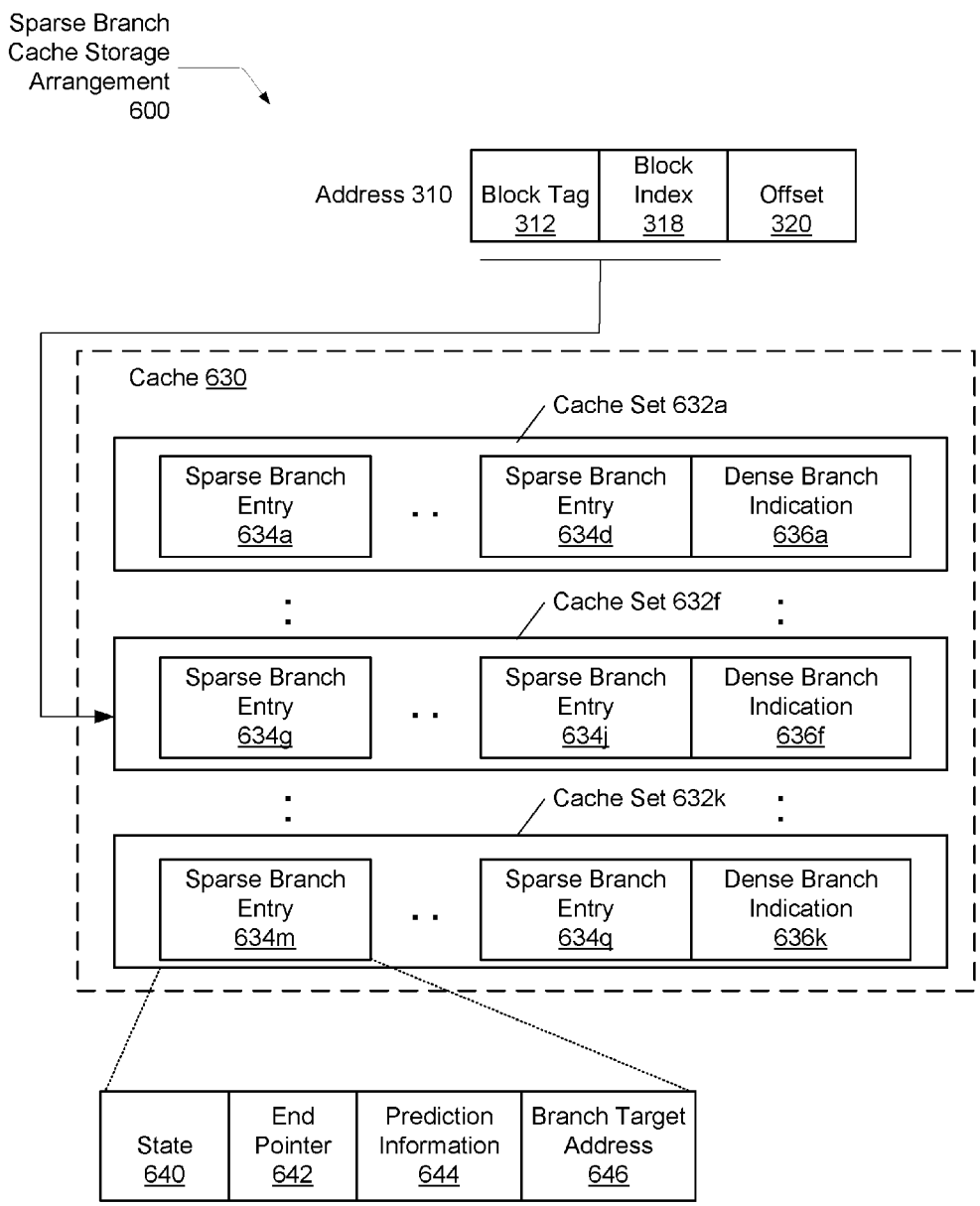
FIG. 6 is a generalized block diagram illustrating one embodiment of a sparse cache storage arrangement.

FIG. 6 illustrates one embodiment of a sparse cache storage arrangement 600, wherein branch prediction information is stored. In one embodiment, cache 630 may be organized as a direct-mapped cache. A predetermined sparse number of entries 634 may be stored in the data portion of a cache line within direct-mapped cache 630. In one embodiment, a sparse number may be determined to be 2. Each entry 634 may store branch prediction information for a particular branch within a corresponding line of i-cache 410. An indication that additional branches may exist within the corresponding line beyond the sparse number of branches is stored in dense branch indication 636.

In one embodiment, each entry 634 may comprise a state field 640 that comprises a valid bit and other status information. An end pointer field 642 may store an indication to the last byte of a corresponding branch instruction within a line of i-cache 410. For example, for a corresponding 64-byte i-cache line, an end pointer field 642 may comprise 6 bits in order to point to any of the 64 bytes. This pointer value may be appended to the linear address value used to index both the i-cache 410 and the sparse branch cache 420 and the entire address value may be sent to the branch prediction unit 500.

The prediction information field 644 may comprise data used in branch prediction unit 500. For example, branch type information may be conveyed in order to indicate a particular branch instruction is direct, indirect, conditional, unconditional, or other. In addition, a bias weight may be stored that may be summed with weights in weight tables in prediction logic and tables 260. As discussed earlier regarding branch prediction unit 500, in one embodiment, 4-bit weights may be read out of two separate tables within prediction tables 260. These tables may be indexed by outputs of hashing functions that combine PC 210 and GSR 240. The corresponding two weights that are read out are sign-extended by two bits and may be added to a bias weight from field 644 that is also sign-extended by two bits. The most-significant-byte (MSB) of the 6-bit sum may be used to indicate the predicted direction of conditional branch instructions.

A corresponding partial branch target address value may be stored in the address field 646. Only a partial branch target address may be needed since a common case may be found wherein branch targets are located within the same page as the branch instruction itself. In one embodiment, a page may comprise 4 KB and only 12 bits of a branch target address needs to be stored in field 646. A smaller field 646 further aids in reducing die area, capacitive loading, and power consumption. For branch targets that require additional bits than are stored in field 646, a separate out-of-page array may be utilized.

The dense branch indication field 636 may comprise a bit vector wherein each bit of the vector indicates a possibility that additional branches exist for a portion within a corresponding line of i-cache 410. For example, field 636 may comprise an 8-bit vector. Each bit may correspond to a separate 8-byte portion within a 64-byte line of i-cache 410. In one embodiment, the first bit may correspond to the first 8 bytes of data in a corresponding line of i-cache 410. Each successive bit in the vector may correspond to the next successive 8 bytes of data in the cache line. In one embodiment, one or more set bits in field 636 may indicate additional branches beyond the sparse number of branches may exist in the 64-byte cache line. A particular set bit in field 636 may indicate additional branches exist in the corresponding group of 8 bytes. In this case, the dense branch cache 430 is indexed. In one embodiment, although dense branch cache 430 may be indexed in parallel with sparse branch cache 420, in order to save power, cache 430 may only be indexed when set bits are found in field 636.

Figure 7:
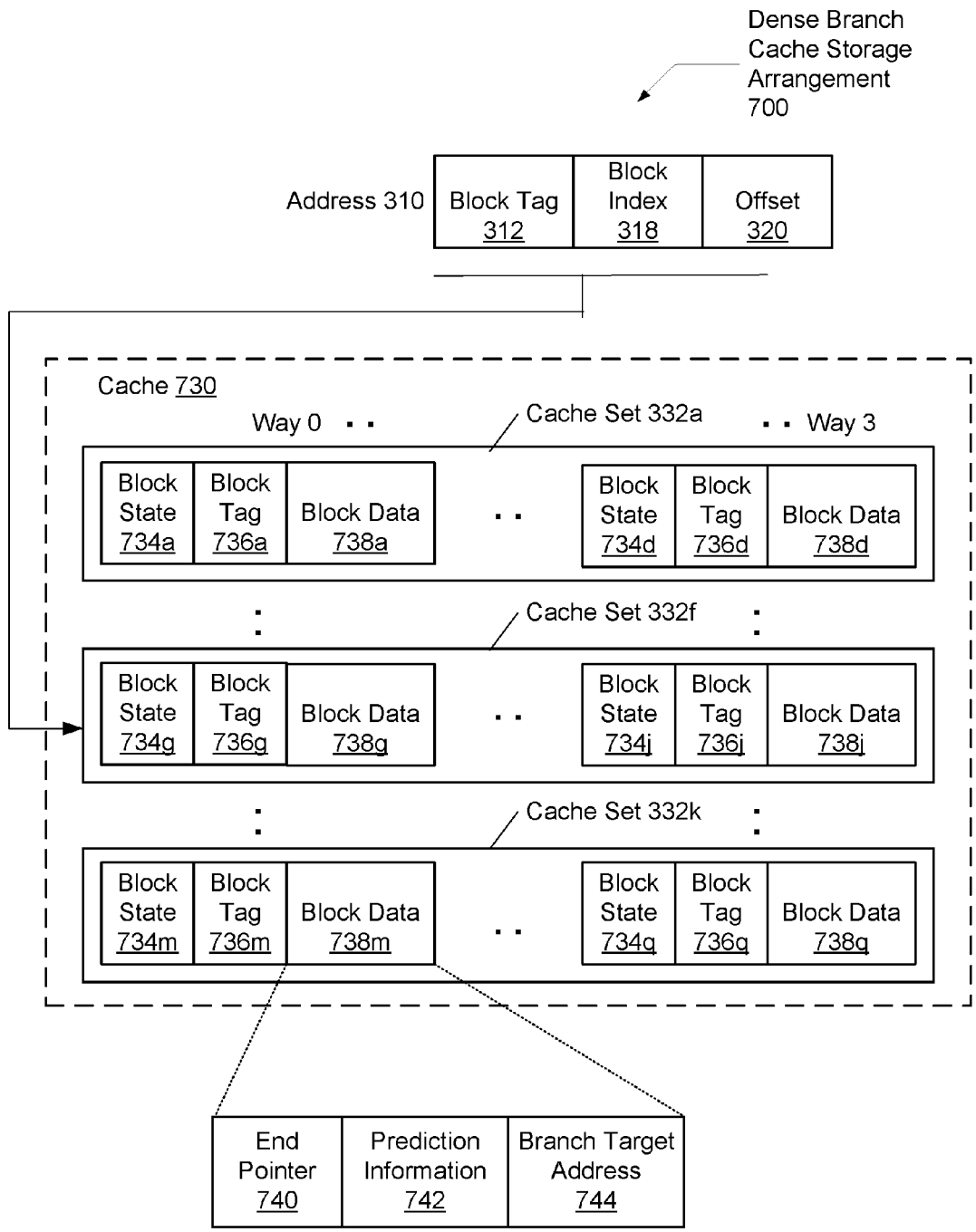
FIG. 7 is a generalized block diagram illustrating one embodiment of a dense branch cache storage arrangement.

FIG. 7 illustrates one embodiment of a dense branch cache storage arrangement 700. In one embodiment, additional branch prediction information is stored using a 4-way set-associative cache organization. Each of the 4 cache lines within a cache set 732 of cache 730 may correspond to an 8-byte region within a 64-byte cache line of i-cache 410. Each of the 4 ways of cache 730 may have state information 734, which may comprise a valid bit and other state information of the corresponding cache line.

An address 310 presented to the cache 730 from a processor core may convey a block index 318 and a portion of an offset 320 in order to select a corresponding cache set 732. The dense branch cache 430 may utilize a different addressable boundary than i-cache 410 and sparse branch cache 420. For example, in one embodiment, caches 410 and 420 may address data with a 64-byte boundary, and dense branch cache 430 may address data with an 8-byte boundary. Therefore, a portion of the offset 320, such as 3 bits of the 6-bit total, may be additionally needed to index cache 730. In one embodiment, block state 734 and block tag 736 may be stored in a separate array, rather than in contiguous bits within a same array. Block tag 336 may be used to determine which of the 4 cache lines are being accessed within a chosen cache set 732. Branch prediction information may be stored in the contiguous bits of block data 738.

In one embodiment, each block data 738 may comprise an end pointer field 740 that stores an indication to the last byte of a corresponding branch instruction within a line of i-cache 410. For example, for a corresponding 64-byte i-cache line, an end pointer field 740 may comprise 3 bits in order to point to any of the bytes within a corresponding 8-byte region. This pointer value may be appended to the linear address value used to index both the i-cache 410 and the sparse branch cache 420, and the entire address value may be sent to the branch prediction unit 500.

In one embodiment, the prediction information field 742 may comprise data similar to branch prediction field 644 in the sparse cache 420. This information may be used in branch prediction unit 500. Branch type information may be conveyed in order to indicate a particular branch instruction is direct, indirect, conditional, unconditional, or other. In addition, a bias weight may be stored that may be summed with weights in weight tables in prediction logic and tables 260. Likewise, the branch target address field 744 may comprise data similar to the address field 646 in the sparse cache 420. Only a partial branch target address may be needed since a common case may be found wherein branch targets are located within the same page as the branch instruction itself. In one embodiment, a page may comprise 4 KB and only 12 bits, rather than a full 32 bits, of a branch target address need to be stored in field 744. A smaller field 744 further aids in reducing die area, capacitive loading, and power consumption. For branch targets that require additional bits than are stored in field 744, a separate out-of-page array may be utilized.

Figure 8:
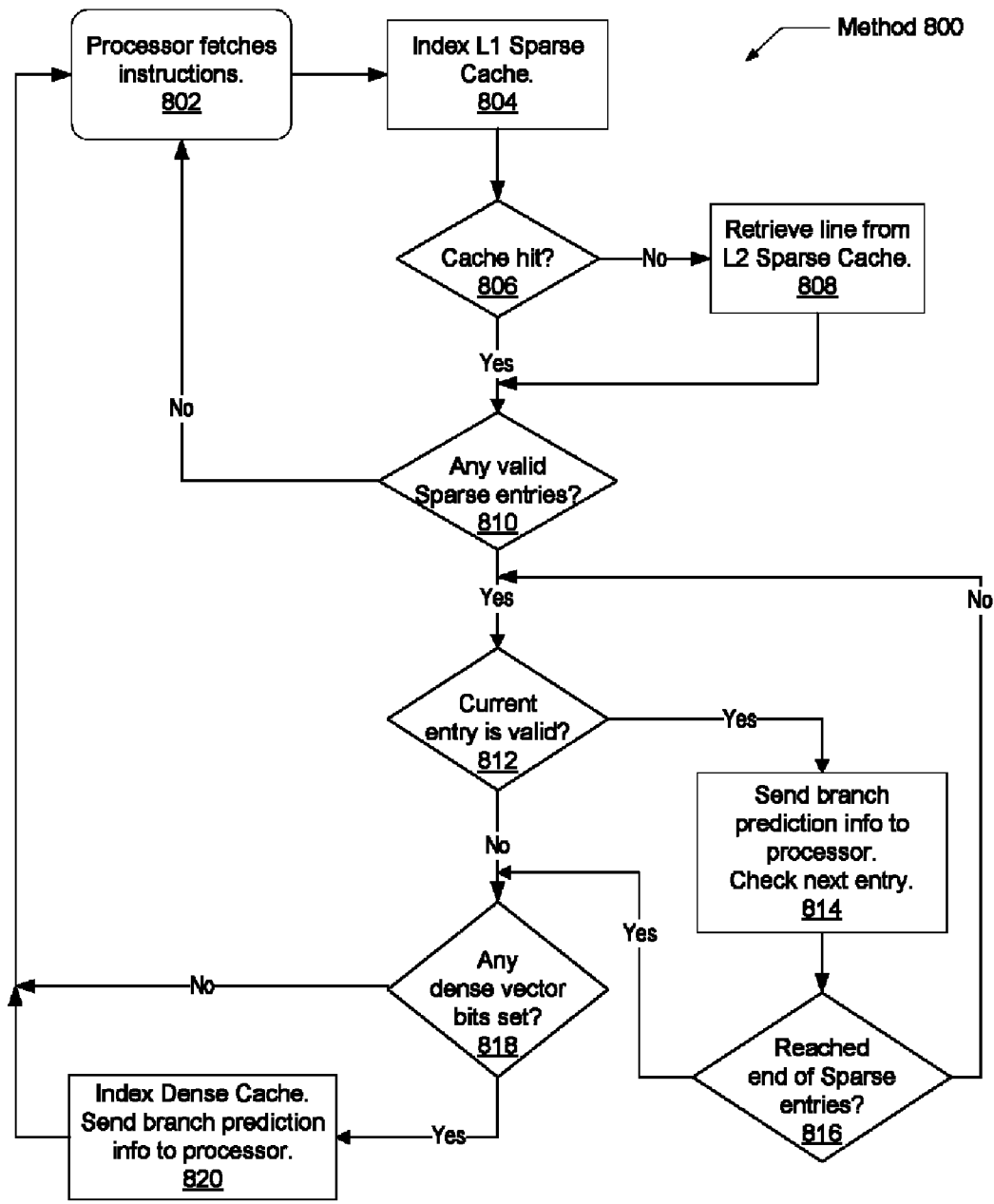
FIG. 8 is a flow diagram of one embodiment of a method for efficient improvement of branch prediction.

FIG. 8 illustrates a method 800 for efficient improvement of branch prediction. Method 800 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. In the embodiment shown, a processor fetches instructions in block 802. A linear address stored in the program counter may be conveyed to i-cache 410 in order to fetch contiguous bytes of instruction data. Depending on the size of a cache line within i-cache 410, the entire contents of the program counter may not be conveyed to i-cache 410. Also, the same address may be conveyed to a sparse branch cache 420 in block 804.

If there is not a cache hit in the L1 sparse branch cache 420 (conditional block 806), then the corresponding cache line may be retrieved from the L2 sparse branch cache in block 808. If a miss does occur, the corresponding cache line in i-cache 410 may not be present either and it needs to be retrieved from the second-level Cache 412. Once the requested line in the L1 sparse branch cache 420 is accessed, the sparse branch entries are checked for valid entries in conditional block 810. In one embodiment, the sparse branch entries may be filled sequentially during code execution. Therefore, there may not be "gaps" of invalid entries between valid entries within the sparse branch cache 420. Once an invalid entry is detected, it may indicate that there are no more branch instructions within the corresponding line of i-cache 410. If no invalid entries are found, then the corresponding line within i-cache 410 may have at least the maximum number of sparse branch instructions. If there are more branch instructions than the predetermined number of sparse branches within this corresponding i-cache line, the bit vector within dense branch indication 636 stored in the sparse branch cache 420 may provide such an indication.

If there are no valid sparse branch entries (conditional block 810), there may not be any branch instructions within a line of i-cache 410 or no branch instructions have been detected yet during code execution. In this case, flow control returns to block 802. Otherwise, the first sparse branch entry is checked. Since the sparse branch entries are filled sequentially and at least one entry is valid, the first sparse branch entry must be valid. The sparse branch entries may be checked in parallel, such as detecting whether or not a valid bit within state field 640 of each sparse branch entry is set. Here, the flow is described sequentially. The current sparse branch entry has its corresponding valid bit checked to determine if the current entry has useful branch prediction information (conditional block 812). If the valid bit indicates there is stored useful information, then in block 814, the sparse branch cache 420 may convey to the processor corresponding information stored in end pointer field 642, branch prediction information field 644, and branch target address field 646. Then the next sparse branch entry has its valid bit checked.

If the total predetermined sparse number of branch entries has not been checked (conditional block 816), then control flow for method 800 returns to block 812. Otherwise, the dense bit vector in the dense branch indication field 636 may be checked for set bits (conditional block 818). If one or more bits are set within this vector, then in block 820 the dense branch cache 430 may be indexed by a portion of the program counter value with more least-significant bits than was used to access the i-cache 410 and the sparse branch cache 420. This may be due to the dense cache being addressable by a finer granularity since each bit in the dense branch indication field 636 may correspond to a region, such as 8 bytes, smaller than an i-cache line, such as 64 bytes.

If the dense branch cache 430 is set-associative, a tag field of the address and a valid bit within field 734 of the dense branch cache may be used to determine the corresponding cache line to send to the processor. This cache line may comprise information stored in an end pointer field 740, a branch prediction information field 742, and a branch target address field 744. Control flow within method 800 then returns to block 802. The number of branch instructions predicted in parallel in a same clock cycle may be dependent on the circuitry within branch prediction unit 500. For example, in one embodiment, sparse branch cache 420 may be able to send branch prediction information for 2 sparse branch instructions to the branch prediction unit 500 in 1 clock cycle. Branch prediction information from a dense branch cache 430 may be sent in a subsequent clock cycle. The number of dense branches represented by the branch prediction information per clock cycle and the number of dense branches predicted per clock cycle depends on the embodiment chosen.

Although the embodiments above have been described in considerable detail, numerous variations and modifications will become apparent to those skilled in the art once the above disclosure is fully appreciated. It is intended that the following claims be interpreted to embrace all such variations and modifications

What is claimed is:

1. A microprocessor comprising:
an instruction cache;
a first sparse cache comprising a first plurality of entries, each of the entries corresponding to an entry of the instruction cache; and
a dense cache comprising a second plurality of entries;
wherein each entry of the first sparse cache is configured to:

store branch prediction information for no more than a first number of branch instructions; and store an indication of whether or not a corresponding entry of the instruction cache includes greater than the first number of branch instructions; and wherein each entry of the dense cache is configured to store branch prediction information for an additional branch instruction not included in said first number of branch instructions.

2. The microprocessor as recited in claim 1, further comprising a second sparse cache configured to store entire evicted entries of said first sparse cache.

3. The microprocessor as recited in claim 2, wherein an entry in the instruction cache and a corresponding entry in the first sparse cache are selected by a same address.

4. The microprocessor as recited in claim 3, wherein the stored indication in an entry of the sparse cache comprises a bit vector utilized to select entries in the dense cache, each bit corresponding to a different region within an entry of the instruction cache.

5. The microprocessor as recited in claim 4, wherein said branch prediction information comprises an end pointer indicating the location of a corresponding branch instruction within an entry of said instruction cache.

6. The microprocessor as recited in claim 5, wherein said branch prediction information indicates a type of branch instruction and a bias weight value to be utilized by a branch prediction unit.

7. The microprocessor as recited in claim 6, wherein said branch prediction information comprises a branch target address to be utilized by a branch prediction unit.

8. A method for improving branch prediction comprising:
storing branch prediction information in an entry of a sparse cache for no more than a first number of branch instructions within an entry of an instruction cache;
storing an indication in said entry of the sparse cache of whether or not a corresponding entry of the instruction cache includes greater than the first number of branch instructions; and
storing in an entry of a dense cache branch prediction information for an additional branch instruction not included in said first number of branch instructions.

9. The method as recited in claim 8, further comprising storing in a second sparse cache evicted entries of said first sparse cache.

10. The method as recited in claim 9, further comprising selecting by a same address an entry in the instruction cache and a corresponding entry in the first sparse cache.

11. The method as recited in claim 10, wherein the stored indication in an entry of the sparse cache comprises a bit vector utilized to select entries in the dense cache, each bit corresponding to a different region within an entry of the instruction cache.

12. The method as recited in claim 11, further comprising indicating the location of a branch instruction within an entry of said instruction cache by a corresponding end pointer included in said branch prediction information.

13. The method as recited in claim 12, further comprising indicating within said branch prediction information a type of branch instruction and a bias weight value to be utilized by a branch prediction unit.

14. The method as recited in claim 13, wherein said branch prediction information comprises a branch target address to be utilized by a branch prediction unit.

15. A hybrid branch prediction device comprising:
a first sparse cache comprising a first plurality of entries, each of the entries corresponding to an entry of an instruction cache; and
a dense cache comprising a second plurality of entries;
wherein each entry of the first sparse cache is configured to:
store branch prediction information for no more than a first number of branch instructions; and
store an indication of whether or not a corresponding entry of the instruction cache includes greater than the first number of branch instructions; and
wherein each entry of the dense cache is configured to store branch prediction information for an additional branch instruction not included in said first number of branch instructions.

16. The hybrid branch prediction device as recited in claim 15, further comprising a second sparse cache configured to store entire evicted entries of said first sparse cache.

17. The hybrid branch prediction device as recited in claim 16, wherein the stored indication in an entry of the sparse cache comprises a bit vector utilized to select entries in the dense cache, each bit corresponding to a different region within an entry of the instruction cache.

* * * * *